JOHN A. BRAGAW.
Improvement in Coal Scuttles.
No. 119,738.  Patented Oct. 10, 1871.
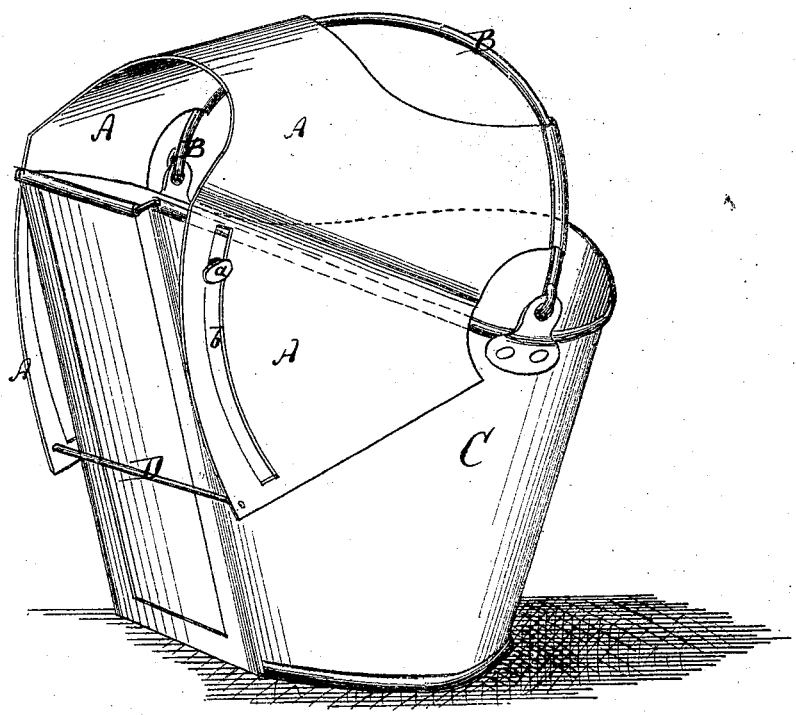
Fig. 2.
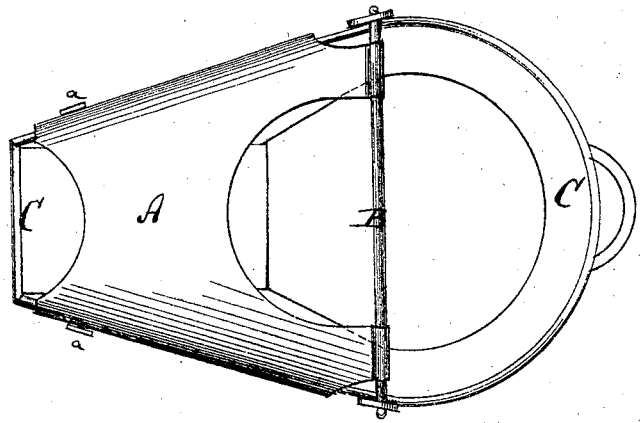
Witnesses:
John Becker.
Francis McArdle.
Inventor:
John A. Bragaw
per
Attorneys.

118,738

UNITED STATES PATENT OFFICE.

JOHN A. BRAGAW, OF KINGSTON, NEW YORK, ASSIGNOR TO HIMSELF AND NELSON INGRAM, OF SAME PLACE.

IMPROVEMENT IN COAL-SCUTTLES.

Specification forming part of Letters Patent No. 119,738, dated October 10, 1871.

*To all whom it may concern:*

Be it known that I, JOHN A. BRAGAW, of Kingston, in the county of Ulster and State of New York, have invented a new and Improved Coal-Scuttle; and I do hereby declare that the following is a full, clear, and exact description thereof, which will enable others skilled in the art to make and use the same, reference being had to the accompanying drawing forming part of this specification.

Figure 1 represents a perspective side view of my improved coal-scuttle. Fig. 2 is a plan or top view of the same.

Similar letters of reference indicate corresponding parts.

This invention relates to improvements in the manner of applying swinging hoods or shields to coal-scuttles, and of guiding the same during or arresting them after motion. My invention consists in the improvement of coal-scuttles, as hereinafter fully described and subsequently pointed out in the claim.

By applying the shield or hood A to the bail B of the scuttle C in such a manner as to leave the middle portion of the bail unobstructed I am enabled to regulate, by the hand that holds the bail, the degree to which the hood should be opened. The shield is at its back edge lapped around the bail or otherwise rigidly secured to the same, and is cut out so as to leave the bail exposed in the middle, convenient to the hand. The ends of the bail are in suitable manner pivoted or hinged to the sides of the scuttle. D is a cross-rod connecting the sides of the shield in front of the scuttle. The rod will strike the nose of the scuttle when the shield is quite opened, preventing it from being raised further than necessary. Pins $a\ a$, which project from the sides of the scuttle into curved grooves or slots $b$ of the shield, may serve to guide and steady the latter during motion, and even stop the same at position of widest opening; but the pins $a$, as well as the rod D, may be dispensed with.

Having thus described my invention, I claim as new and desire to secure by Letters Patent—

1. The swinging hood A of a coal-scuttle, when rigidly affixed to the bail B, so that it can thereby be controlled, substantially as specified.

2. The cross-rod D, affixed to the swinging hood A in front of the scuttle, substantially as and for the purpose herein set forth.

JOHN A. BRAGAW.

Witnesses:
J. M. VAN WAGONER,
WILL. H. McELROY, Jr.                                (112)